(12) United States Patent
Kamigauchi

(10) Patent No.: US 8,134,315 B2
(45) Date of Patent: Mar. 13, 2012

(54) METHOD AND APPARATUS FOR STOPPING SERVO MOTOR

(75) Inventor: Yuji Kamigauchi, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 517 days.

(21) Appl. No.: 12/360,890

(22) Filed: Jan. 28, 2009

(65) Prior Publication Data

US 2009/0189551 A1   Jul. 30, 2009

(30) Foreign Application Priority Data

Jan. 29, 2008   (JP) .................................. 2008-016998

(51) Int. Cl.
*H02P 3/14* (2006.01)

(52) U.S. Cl. .................... 318/376; 318/375; 318/400.26; 318/400.28

(58) Field of Classification Search .................. 318/801, 318/362, 375, 376, 400.26, 400.28
See application file for complete search history.

(56) References Cited

U.S. PATENT DOCUMENTS

| | | | | |
|---|---|---|---|---|
| 4,096,423 A | * | 6/1978 | Bailey et al. ................... | 318/370 |
| 5,111,091 A | * | 5/1992 | Bahn ........................... | 310/68 B |
| 5,261,501 A | * | 11/1993 | Tsuchiya et al. ............... | 180/412 |
| 6,573,681 B2 | * | 6/2003 | Schwesig ....................... | 318/801 |
| 6,909,255 B2 | * | 6/2005 | Janicke et al. ............ | 318/400.28 |
| 6,913,122 B2 | * | 7/2005 | Fujita et al. .................... | 188/156 |
| 6,999,326 B2 | * | 2/2006 | Eckardt et al. ........... | 318/400.26 |
| 7,106,015 B2 | * | 9/2006 | Muroi ........................... | 318/376 |
| 7,253,577 B2 | * | 8/2007 | Campbell et al. ............. | 318/563 |
| 7,529,111 B2 | * | 5/2009 | Schierling ....................... | 363/98 |
| 2002/0084766 A1 | | 7/2002 | Schwesig | |
| 2004/0089793 A1 | | 5/2004 | Watanabe et al. | |

FOREIGN PATENT DOCUMENTS

| | | |
|---|---|---|
| EP | 1419858 A2 | 5/2004 |
| EP | 1524761 A2 | 4/2005 |
| JP | 59-7679 A | 1/1984 |
| JP | 8-191591 A | 7/1996 |
| JP | 8-256493 A | 10/1996 |
| JP | 2004-154916 A | 6/2004 |

OTHER PUBLICATIONS

Japanese Patent Office Action issued in Japanese patent application No. JP 2008-016998 dated Nov. 24, 2009.
Extended European search report dated Oct. 25, 2010 issued in corresponding European application No. 09001038.0.

\* cited by examiner

*Primary Examiner* — Rita Leykin
(74) *Attorney, Agent, or Firm* — Sughrue Mion, PLLC

(57) ABSTRACT

The servo motor is controlled by a control signal from a control circuit. A common branch line is separated from a positive common line in accordance with information that a safety door is opened. Thus, a first gate drive circuit group is made inoperative. Then, a second gate drive circuit group is operated to thereby short-circuit the U–, V– and W–phases of the motor to place in a regenerative braking state.

10 Claims, 2 Drawing Sheets

_US 8,134,315 B2_

METHOD AND APPARATUS FOR STOPPING SERVO MOTOR

This application claims priority from Japanese Patent Application No. 2008-016998, filed on Jan. 29, 2008, the entire subject matter of which is incorporated herein by reference.

BACKGROUND OF THE INVENTION

1. Field of the Invention

The present invention relates to a method of stopping a servo motor, which is driven by a three-phase AC current generated by an inverter circuit, without intervening a control portion for controlling the inverter circuit or directly stopping the servo motor passing through the control portion, and also relates to a stopping apparatus used at the time of implementing the method. In particular, the present invention relates to the method of stopping the servo motor and the servo motor stopping apparatus that are suitably applied to the servo motor required to be safety which is used for a tool machine, a production machine or an industrial machine etc., although not limited thereto.

2. Description of the Related Art

The production machine or the industrial machine is provided with a member which operates with a quite large force and at a high speed to process and transfer material, that is, an operation member. Since a serious accident arises if a worker directly touches such the operation member, a movable protection guard is provided so as to realize the safety measure for preventing an accident.

However, the safety can not be secured sufficiently by merely providing the movable protection guard. To be more in detail, at the time of performing the maintenance of the industrial machine, it is required to perform the maintenance procedure while opening the movable protection guard. During such the maintenance procedure, a required constituent member is applied with a brake so as not to drive a movable portion. Further, such a safety measure is employed that in the case where a driving source is a hydraulic type, a release valve is opened to interrupt the supply of operation oil to a hydraulic cylinder. The similar safety measure is employed when the driving source is a servo motor.

A servo motor employed in the production machine or the industrial machine, that is, a servo motor driven by a three-phase AC current has been provided with three stator windings of a U-phase, a V-phase and a W-phase provided within the motor, three terminals for applying voltages thereto and an encoder for detecting a rotational position, etc. When predetermined voltages are applied to the stator windings of the U-phase, V-phase and W-phase, magnetic field is generated and a torque is applied to the rotary of the servo motor configured by a permanent magnet. Thus, when the polarities and durations of the voltages applied to the U-, V- and W-phases are controlled in accordance with the rotational position detected by the encoder, the motor can be driven and rotated in an arbitrary direction with an arbitrary torque. Although such the voltages are generated by an inverter circuit, the inverter circuit is controlled in accordance with a signal from a control portion. JP-A-8-191591 discloses a method of stopping such the servo motor.

According to the servo motor stopping method described in JP-A-8-191591, in the case of stopping the servo motor being driven and rotated, first, voltages are applied to the U-, V- and W-phases so that a reverse rotation torque is generated in order to rotate the motor in a direction in opposite to the current rotational direction. Then, when the rotation speed reduces to or less than a predetermined speed, DC voltages of predetermined polarities are applied to the U-, V- and W-phases to excite by DC to thereby stop the servo motor.

However, the related art servo motor stopping method has some disadvantages. For example, according to the servo motor stopping method described in JP-A-8-191591, since the reverse rotation torque is generated at first, the servo motor can be decelerated abruptly. Further, when the rotation speed reduces to or less than the predetermined speed, the DC energization is performed to completely stop the motor. Thus, the method has an effect that the servo motor can be stopped in a short time. However, there arises a problem when as the safety method for the production machine etc., the servo motor stopping method is applied to the case where the servo motor is kept in the stopped state. For example, when the DC voltage having been applied to the U-, V- and W-phases is stopped after the servo motor stops, no torque is applied to the servo motor. Thus, since no brake is applied to the servo motor, it becomes impossible to prevent the mechanical member from falling due to the weight of a mechanical member coupled to the servo motor. On the other hand, when the DC voltage is kept to be applied to the U-, V- and W-phases after stopping the servo motor, although the servo motor can be kept in the stopped state, energy is consumed wastefully since an amount of the power consumption is large. Further, since the current flows into the stator windings for a long time, a large amount of heat may be generated, which may cause the breakage of a wire etc.

Further, the servo motor stopping method described in JP-A-8-191591 has a problem that even after stopping the servo motor, the servo motor is continued to be supplied with the power and so continuously controlled by the signal from the control portion. In a state that the power supply to the servo motor is not interrupted, if the control portion generates an abnormal signal, the servo motor is driven.

The control portion is configured by a hardware including a CPU and a memory etc. and a program formed by combining various kinds of instructions, that is, software. Although the reliability of the hardware has been improved recently, there is no guarantee that the hardware does not become faulty. The hardware may catch noise and operate erroneously, that is, runaway. Also as to the software, even if the software is tested sufficiently at the time of the development and the quality thereof is secured, since advanced and complicated programs have been developed in many cases due to the recent tendency of the high-performance of the production machine, it is impossible to completely eliminate the possibility that the program may contain software bug potentially. The control portion may generates an abnormal signal due to such the abnormality of the hardware or software. Thus, the stoppage of the servo motor is not guaranteed and so the safety of workers is not guaranteed.

SUMMARY OF THE INVENTION

An object of the invention is to provide a method of stopping a servo motor and a stopping apparatus for the servo motor which are applied to tool machines or production machines and can solve the aforesaid problems of the related art. To be concrete, the object of the invention is to provide the method of stopping the servo motor and the stopping apparatus for the servo motor which, when a movable protection guard, for example, provided at a production machine etc. is opened or a sensor detects that the production machine is in a maintenance state, can surely maintain the servo motor in a stopped state without consuming electric power wastefully and also can prevent the servo motor from erroneously operating due to the runaway etc. of a control portion.

In order to attain the aforesaid object, the invention is configured in a manner that when disconnected from the common line in response to a signal representing the opened state of the movable protection guard, the control circuit for controlling the servo motor is disabled to stop the energy supply to the servo motor and the servo motor is placed in a state being applied with a regenerative braking force. Further, to be concrete, among the gate drive circuits for operating the upper and lower arm circuits of the arm circuits constituting the inverter circuit for supplying the three-phase AC current to the servo motor, when one of the first gate drive circuit group for operating the upper arm circuits and the second gate drive circuit group for operating the lower arm circuits is made inoperable, the other gate drive circuit group is configured to be directly operated without intervening the control portion to place each of the U–, V– and W–phases of the servo motor in a short-circuit state to thereby place the servo motor in a state being applied with a regenerative braking force.

That is, according to a first aspect of the invention, there is provided a method of stopping a servo motor provided in a servo motor stopping apparatus, the servo motor stopping apparatus comprising: an inverter circuit comprising first to third arm circuits, each of the first to third arm circuits comprises an upper arm circuit and a lower arm circuit; six gate drive circuits provided in correspondence to the upper arm circuits and the lower arm circuits of the first to third arm circuits, respectively; and a control circuit that applies gate signals to the six gate drive circuits, respectively, wherein, when the control circuit outputs predetermined gate signals, the inverter circuit generates a three-phase AC current so as to drive the servo motor, the method of stopping a servo motor comprising: separating one of a first gate drive circuit group and a second gate drive circuit group from a common line so as to place the one of the first gate drive circuit group and the second gate drive circuit group in an inoperable state, the first gate drive circuit group corresponding to the upper arm circuits of the first to third arm circuits, and the second gate drive circuit group corresponding to the lower arm circuits of the first to third arm circuits among the six gate drive circuits; and operating the other one of the first gate drive circuit group and the second gate drive circuit group in accordance with a signal representing the separation from the common line to place each of U–, V– and W–phases of the servo motor in a short-circuit state so as to place the servo motor in a state being applied with a regenerative braking force.

According to a second aspect of the invention, in the method of stopping a servo motor, the separation from the common line is performed in association with a detection of an opened state of a movable protection guard provided at a production machine or an industrial machine.

According to a third aspect of the invention, there is provided a servo motor stopping apparatus comprising: an inverter circuit that supplies three-phase AC current to the servo motor; first to third arm circuits, which configure the inverter circuit, and each of which comprises an upper arm circuit and a lower arm circuit; six gate drive circuits, which are provided in correspondence to the upper arm circuits and lower arm circuits, and which operate the upper and lower arm circuits; a control circuit that outputs gate signals to the six gate drive circuits via gate signal lines, respectively; a common line, to which a predetermined voltage is applied; and a common branch line that is coupled to the common line via a switch so as to be disconnectable therefrom, wherein a first gate drive circuit group corresponds to the upper arm circuits of the first to third arm circuits and the second gate drive circuit group corresponds to the lower arm circuits of the first to third arm circuits, among the six gate drive circuits, wherein one of the first gate drive circuit group and the second gate drive circuit group is coupled to the common line and the other of the first gate drive circuit group and the second gate drive circuit group is coupled to the common branch line, wherein the control circuit comprises a logic circuit comprising predetermined logic elements, branch lines of the common branch line being coupled to gate signal lines of the one gate drive circuit group via the logic circuits, respectively, and wherein, when the switch is turned off to disconnect the common branch line from the common line, the other gate drive circuit group is made inoperable and the one gate drive circuit group is operated by the gate signals from the logic circuits to place each of U–, V– and W–phases of the servo motor in a short-circuit state, and the servo motor is placed in a state being applied with a regenerative braking force.

According to a fourth aspect of the invention, in the servo motor stopping apparatus, the servo motor is a servo motor provided in a production machine or an industrial machine.

According to a fifth aspect of the invention, in the servo motor stopping apparatus, the switch is turned off when the switch detects an opened state of a movable protection guard provided at a production machine or an industrial machine.

According to the aspects of the invention, among the gate drive circuits for operating the upper and lower arm circuits of the arm circuits constituting the inverter circuit, since one of the first gate drive circuit group for operating the upper arm circuits and the second gate drive circuit group for operating the lower arm circuits is made inoperable, the U–, V– and W–phases of the servo motor are not applied with the positive side voltage or the negative side voltage. Further, since the other gate drive circuit group operates without intervening the control portion, the upper arm circuits or the lower arm circuits are simultaneously operated to place each of the U–, V– and W–phases of the servo motor in a short-circuit state to thereby place the servo motor in a state being applied with a regenerative braking force. Thus, the invention can attain the following unique technical advantages. That is, the servo motor can be stopped without consuming electric power wastefully. Further, there is no fear that the erroneous operation may occur due to the runaway of the control portion such as a CPU. Furthermore, according to another aspect of the invention, since the servo motor is stopped when the opened state of the movable protection guard of a production machine is detected, the safety of workers can be guaranteed even during the maintenance procedure of the production machine.

DETAILED DESCRIPTION OF THE PREFERRED EMBODIMENTS

Figure 1:
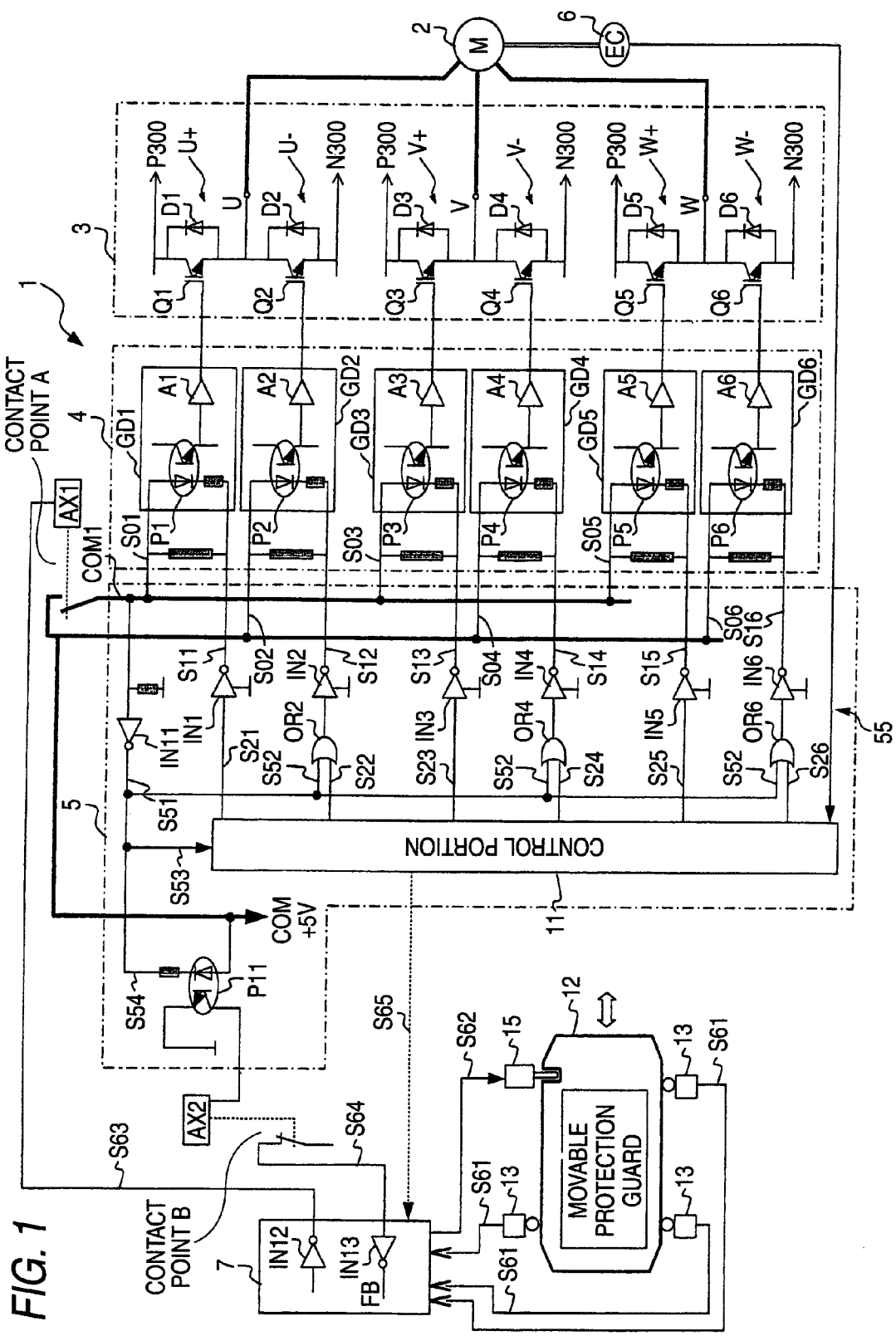
FIG. 1 is a circuit diagram of a servo motor stopping apparatus according to an embodiment.

Hereinafter, an embodiment of the invention will be explained. Since the stopping apparatus 1 for a servo motor according to the embodiment of the invention is incorporated in a related art apparatus for controlling and driving a servo motor, most of the configuration of the stopping apparatus is configured in a similar manner as the related art apparatus for controlling and driving a servo motor. That is, as shown in FIG. 1, the stopping apparatus 1 for a servo motor is configured by an inverter circuit 3 for applying a voltage to the servo motor 2, a drive circuit 4 for operating the inverter circuit 3, a control circuit 5 for controlling the drive circuit 4, an encoder 6 which is provided in relation to the servo motor 2 so as to detect the rotational position of the motor and transmit the detected position to the control circuit 5, and a sequencer 7 for enabling and disenabling the driving of the servo motor 2.

Although not shown in the drawings, the servo motor 2 is configured in a manner that the one ends of three stator windings configured by three-phases of U–, V– and W–phases are coupled to form a star connection and the other three terminals of the respective phases are provided outside of the motor. Thus, the rotor of the motor can be driven and rotated in an arbitrary direction with an arbitrary torque by controlling the polarities and durations of the voltages applied to the U–, V– and W–phases.

The inverter circuit 3 is a three-phase voltage control type inverter circuit and is configured by three arm circuits, that is, first to third arm circuits U, V and W corresponding to the U–, V– and W–phases, respectively. Each of the arm circuits U, V and W is configured by an upper arm circuit for applying a voltage of the positive polarity and a lower arm circuit for applying a voltage of the negative polarity. That is, the inverter circuit 3 is configured by the first to third upper arm circuits U+, V+ and W+ and the first to third lower arm circuits U–, V– and W–.

Figure 2:
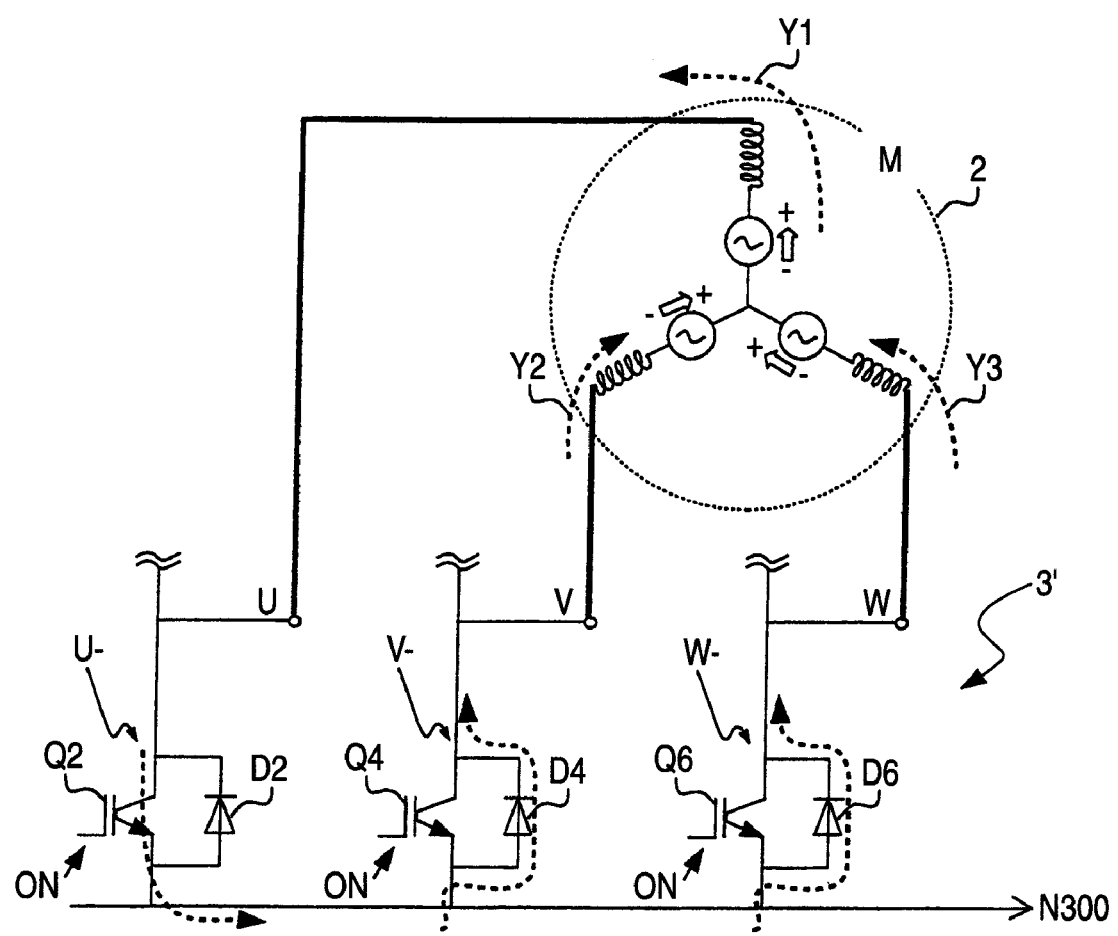
FIG. 2 is an operation explanation diagram for schematically showing a state where a servo motor is regeneratively braked by the servo motor stopping apparatus according to the embodiment.

Each of the first to third upper and lower arm circuits U+, U– - - - is configured by a transistor Q1 or Q2 - - - formed by an insulated gate bipolar transistor, that is, IGBT and a diode D1 or D2 - - - . Each of the diodes D1, D2 - - - is coupled in parallel and in an opposite direction to the transistor Q1 or Q2 - - - so as to flow a current from the emitter to the collector of the transistor Q1 or Q2 - - - . Of these upper and lower arm circuits, the first to third upper arm circuits U+, V+ and W+ are configured in a manner that each of the collectors of the transistors Q1, Q3 and Q5 is coupled to the positive polarity side of a DC driving power supply of 300 volt and the emitters thereof are coupled to the U–, V– and W–phase terminals of the servo motor 2, respectively. Similarly, as also shown in FIG. 2, the first to third lower arm circuits U–, V– and W– are configured in a manner that the collectors of the transistors Q2, Q4 and Q6 are coupled to the U–, V– and W–phase terminals of the servo motor 2, respectively, and each of emitters thereof is coupled to the negative polarity side of the DC driving power supply of 300 volt. Thus, when the voltage is applied to each of the gates of the transistors Q1, Q3 and Q5 of the upper arm circuits U+, V+ and W+, the collector-to-emitter of each of the transistors Q1, Q3 and Q5 is placed in a conductive state, so that voltages of positive polarity are applied to the corresponding phases of the servomotor, respectively. Similarly, when the voltage is applied to each of the gates of the transistors Q2, Q4 and Q6 of the lower arm circuits U–, V– and W–, the collector-to-emitter of each of the transistors Q2, Q4 and Q6 is placed in a conductive state, so that voltages of negative polarity are applied to the corresponding phases of the servo motor, respectively. The diodes D1, D2, - - - are flywheel diodes provided in order to prevent the transistors Q1, Q2, - - - from being broken by an counter electro-motive force instantaneously generated at the time of the stoppage of the servo motor 2, etc. However, as described in detail later, each of these diodes also acts to place the circuit in a short-circuit state to thereby flow the current on the collector side from the emitter when the servo motor 2 is stopped by the regenerative braking force.

The drive circuit 4 acts to electrically insulate between the inverter circuit 3 and the control circuit 5 by means of photo couplers to thereby protect the control circuit 5 from the voltage of the driving power supply. The drive circuit 4 also acts to receive gate signals from the control circuit 5, then apply voltages to the gates of the transistors Q1, Q2, - - - of the first to third upper and lower arm circuits U+, U–, - - - of the inverter circuit 3 to thereby drive the inverter circuit 3. Such the drive circuit 4 is configured by six gate drive circuits, that is, first to sixth gate drive circuits GD1, GD2, - - - corresponding to the first to third upper and lower arm circuits U+, U–, - - - .

Each of the first to sixth gate drive circuits GD1, GD2, - - - is configured by a single photo coupler P1 or P2, - - - and a single amplifier A1 or A2, - - - . Each of the photo couplers P1, P2, - - - is formed by a photo transistor and a light emitting diode. The photo transistor is coupled on the inverter circuit 3 side and the light emitting diode is coupled on the control circuit 5 side. To explain more in detail, the emitters of the photo transistors of the photo couplers are coupled to the gates of the transistors Q1, Q2, - - - of the upper and lower arm circuits U+, U–, - - - of the inverter circuit 3 via the amplifiers A1, A2, - - -, respectively. Each of the anode side signal lines S01, S02, - - - of the light emitting diodes is coupled to a positive common line COM, that is, a common line of +5 volt. Each of the cathode side signal lines, that is, gate signal lines S11, S12, - - - are coupled to the control circuit 5. Thus, when the gate signal of 0 volt representing the operation is superimposed on the gate signal lines S11, S12, - - - , the photo couplers P1, P2, - - - are operated, whereby the upper and lower arm circuits U+, U–, - - - are operated by the voltages amplified by the amplifiers A1, A2, - - - , respectively.

Such the gate drive circuits GD1, GD2, - - - are divided into a first gate drive circuit group GD1, GD3 and GD5 corresponding to the first to third upper arm circuits U+, V+ and W+ and a second gate drive circuit group GD2, GD4 and GD6 corresponding to the first to third lower arm circuits U–, V– and W–. In the aforesaid explanation, the explanation is made that the anode side signal lines S01, S02, - - - of the light emitting diodes of the photo couplers P1, P2, - - - of all the gate drive circuits GD1, GD2, - - - are coupled to the positive common line COM. However, correctly, the signal lines S01, S03 and S05 belonging to the first gate drive circuit group GD1, GD3 and GD5 are coupled to the common branch line COM1 of the positive common line COM.

The control circuit 5 is a circuit for outputting the gate signals to the drive circuit 4 and is configured by a control portion 11 formed by a CPU, a memory etc. and a logic circuit 55 formed by logic elements, etc. The control portion 11 generates control signals in accordance with a predetermined operation condition and also in accordance with the rotation position detected by the encoder 6. The control portion 11 also generates control signals for so-called PWM control for applying control pulse signals each having a short and variable time width to thereby control the torque of the servo motor. The control signals for controlling the first to third arm circuits U+, U–, - - - are transmitted via the signal lines S21, S22, - - - coupled to the control portion 11.

The logic circuit 55 is a circuit for converting the control signals transmitted from the control portion 11 into the gate signals for operating the drive circuit 4. The three signal lines S21, S23 and S25 are coupled to the gate signal lines S11, S13 and S15 of the first gatedrive circuit group GD1, GD3 and GD5 vialogic elements for inverting the voltage, that is, inverter elements IN1, IN3 and IN5, respectively. Although circuits peculiar to the stopping apparatus 1 of the servo motor according to the embodiment is contained, the other three signal lines S22, S24 and S26 are coupled to the gate signal lines S12, S14 and S16 of the second gate drive circuit group GD2, GD4 and GD6 via the inverter elements IN2, IN4 and IN6, respectively. The gate signal lines S11, S12, are respectively coupled via the inverter elements IN1, IN2, - - - . This is because the circuits of the control system of the apparatus according to the embodiment are configured as the positive common of +5 volt, and further it is intended to convert the control signal transmitted from the control portion 11 and having 0 volt representing the stop and +5 volt representing the operation into a control signal having +5 volt representing the stop and 0 volt representing the operation, that is, the gate signal.

As described above, the logic circuit 55 is provided with the circuits peculiar to the stopping apparatus 1 of the servo motor. That is, the signal lines S22, S24 and S26 are logical-summed with branch signal lines S52, S52 and S52 explained later by OR elements OR2, OR4 and OR6, and the outputs of the OR elements are coupled to the gate signal lines S12, S14 and S16 via the inverter elements IN2, IN4 and IN6, respectively. Thus, when the control signals of +5 volt each representing the operation are superimposed on the branch signal lines S52, S52 and S52, the gate signals of 0 volt each representing the operation are superimposed on the gate signal lines S12, S14 and S16, respectively. Then, the second gate drive circuit group GD2, GD4 and GD6 is operated and simultaneously the first to third lower arm circuits U–, V– and W– are operated.

The signal line S51 is a branch line of the common branch line COM1 of the positive common line COM and an inverter element IN11 is provided on the way of this signal line. In a state where the positive common line COM and the common branch line COM1 are coupled, since the voltage of the common branch line COM1 is also +5 volt, this voltage is inverted by the inverter element IN11 and hence the voltage of the signal line S51 becomes 0 volt. However, as explained later, when a first relay AX1 is turned off, since the common branch line COM1 is disconnected from the positive common line COM, the voltage of the common branch line COM1 becomes 0 volt. Thus, the voltage of the common branch line is inverted by the inverter element IN11 and hence the voltage of the signal line S51 becomes +5 volt. Such the signal line S51 is branched into the branch signal lines S52, S52, - - - and branch signal lines S53, S54. The branch signal line S53 is coupled to the control portion 11, whereby the voltage state of the common branch line COM1 is monitored. The branch signal line S54 is coupled to a photo coupler P11. The photo coupler P11 will be explained in detail. The anode side of a light emitting diode within the photo coupler is coupled to the positive common line COM of +5 volt and the cathode side thereof is coupled to the branch signal line S54. The collector of a photo transistor within the photo coupler P11 is coupled to a second relay AX2 and the emitter thereof is grounded. When the photo coupler P11 is not operated, that is, when the voltage of the branch signal line S54 is +5 volt, the second relay AX2 is turned off. In contrast, when the voltage of the branch signal line S54 becomes 0 volt, the photo coupler P11 is operated and so the second relay AX2 is turned on.

The sequencer 7 is an apparatus which is arranged to enable the servo motor 2 to drive only when a movable protection guard 12 is closed and to disable the servo motor 2 from being driven when the movable protection guard 12 is opened to thereby secure the safety of workers. Sensors 13, 13, - - - provided at the movable protection guard 12 are coupled to the sequencer 7 via signal lines S61, S61, - - - , respectively, so that the opening/closing state of the door is notified. A signal line S62 for operating a guard lock 15 is also coupled to the sequencer 7 so as to be able to lock and unlock the movable protection guard 12. The sequencer 7 is coupled to the first relay AX1 via an inverter element IN12 therein and a signal line S63 so as to be able to turn on/off the first relay AX1. Each of the positive common line COM and the common branch line COM1 is coupled to a contact point A of the first relay AX1. Thus, when the first relay AX1 is turned off by the sequencer 7 via the signal line S63, as explained above, the positive common line COM is disconnected from the common branch line COM1. Since the common branch line COM1 is grounded via a resistor, the voltage of the common branch line COM1 becomes 0 volt with a slight time delay after the turning-off.

The sequencer 7 is also coupled to a signal line S64 via an inverter element IN13 therein. The signal line S64 is coupled to a contact point B of the second relay AX2. Thus, the coupling state between the positive common line COM and the common branch line COM1 can be detected from the operation states of the first and second relays AX1 and AX2, as explained later. Further, the sequencer 7 is coupled to the control portion 11 via a signal line S65, so that the operation/stop state of the servo motor 2 is directly notified to the sequencer 7 from the software operating in the control portion 11.

Next, the action of the stopping apparatus 1 of the servo motor 2 according to the embodiment will be explained. First, the explanation will be made as to a case for placing the servo motor 2 in a state capable of being driven. An operator closes the movable protection guard 12 and performs a predetermined operation. Thus, the sequencer 7 confirms by using the sensors 13, 13, - - - that the movable protection guard 12 is in the closed state and then operates the guard lock 15 to thereby lock it. Thereafter, the sequence 7 turns the first relay AX1 on. When the first relay AX1 is turned on, since the positive common line COM and the common branch line COM1 are coupled, the control voltage of +5 volt is supplied to the first gate drive circuit group GD1, GD3 and GD5. Thus, all the gate drive circuits GD1, GD2, - - - are coupled to the positive common line COM. Since the voltage +5 volt of the common branch line COM1 is inverted by the inverter element IN11, the voltage of the signal line S51 is 0 volt, whereby the control portion 11 is notified via the branch signal line S53 that the servo motor 2 is placed in the state capable of being driven. Further, since the voltage of the branch signal line S54 is also 0 volt, the photo coupler P11 is operated to turn the second relay AX2 on. Thus, the sequencer 7 detects via the signal line S64 that the servo motor 2 is placed in the state capable of being driven. Then, the control portion 11 generates the control signals in accordance with the set operation condition to drive the servo motor 2 based on the control signals.

Next, the explanation will be made as to the case where the servo motor 2 is placed in a state never being driven from the state capable of being driven. In the state where the servo motor 2 is placed in the state capable of being driven, the movable protection guard 12 is closed and each of the first and second relays AX1 and AX2 is tuned on. An operator performs the predetermined operation to supply a stop command for stopping the servo motor 2. Thus, the servo motor 2 decelerates and stops while being controlled in accordance with the control signals from the control portion 11. The software operated in the control portion 11 confirms that the servo motor 2 is stopped and notifies the stoppage of the servo motor 2 to the sequencer 7 via the signal line S65, whereby the sequencer 7 unlocks the guard lock 15. Thus, it becomes possible for an operator to open the movable protection guard 12. When the movable protection guard 12 is opened, the sequencer 7 is notified by the sensors 13, 13, - - - that the movable protection guard 12 is placed in the opened state, whereby the sequencer 7 turns the first relay AX1 off. When the first relay AX1 is turned off, the common branch line COM1 is disconnected from the positive common line COM and so the voltage of the common branch line COM1 becomes 0 volt. Thus, the first gate drive circuit group GD1, GD3 and GD5 do not operate even if the gate signals are supplied thereto via the gate signal lines S11, S13 and S15, respectively, so that each of the first to third upper arm circuits U+, V+ and W+ does not operate. In this manner, since the servo motor 2 is not applied with the positive side driving voltage, the energy supply to the servo motor 2 is stopped.

When the voltage of the common branch line COM1 becomes 0 volt, the voltage of the common branch line COM1 is inverted by the inverter element IN11 and the voltage of the signal line S51 becomes +5 volt. Therefore, the voltage of each of the branch signal lines S52, S52 and S52 becomes +5 volt representing the operation. Thus, the gate signals are outputted via the OR elements OR2, OR4 and OR6, the inverter elements IN2, IN4 and IN6 and gate signal lines S12, S14 and S16 to thereby drive the second gate drive circuit group GD2, GD4 and GD6, respectively. Then, since the first to third lower arm circuits U−, V− and W− are operated simultaneously, each of the U−, V− and W−phases of the servo motor 2 is coupled to the DC power supply of the negative side.

Since the DC power supply of the negative side is common, as shown in FIG. 2, the U−, V− and W−phases of the servo motor 2 are mutually coupled via the lower arm circuits U−, V− and W−. Since each of the transistors Q2, Q4 and Q6 is tuned on, current can be flown on the emitter sides from the collector sides of the transistors Q2, Q4 and Q6 with quite a little amount of resistance value. Further, the current can also be flown to the collector sides from the emitter sides freely due to the actions of the diodes D2, D4 and D6. Thus, since the lower arm circuits U−, V− and W− can flow the current to the arbitrary direction, the U−, V− and W−phases of the servo motor 2 are mutually short-circuited by a closed circuit with a small resistance value. When a mechanical member etc. coupled to the servo motor 2 is going to fall due to the weight thereof, the rotary of the servo motor 2 starts to rotate. However, in this case, the electromotive force is generated at the stator windings of the U−, V− and W−phases of the servo motor 2 due to the permanent magnet constituting the rotor. A current flows instantaneously due to the generated electromotive force and the small resistance value as shown by arrows of dotted lines in FIG. 2. Magnetic force is generated at each of the stator windings of the U−, V− and W−phases due to such currents Y1, Y2 and Y3 thus generated. The magnetic force repels against the permanent magnet of the stator to thereby generate a force for stopping the rotation of the motor. Since the resistance value of the closed circuit is sufficiently small, the power loss due to the resistance value is quite small, so that the servo motor 2 can be regeneratively braked efficiently. Thus, since the servo motor 2 rotates scarcely, the safety of workers can be secured.

The control portion 11 is notified via the branch signal line S53 that the common branch line COM1 is disconnected from the positive common line COM. Further, since the voltage of the branch signal line S54 also becomes +5 volt and the photo coupler P11 can not operate, the second relay AX2 is turned off. The sequencer 7 receives a B contact signal of the second relay AX2 to thereby confirm that the safety of workers is secured.

If the first relay AX1 or the second relay AX2 fuses, for example, since the start condition cannot be satisfied in the sequencer 7 even if the movable protection guard 12 is closed and the closed state is detected by the sensors 13, 13, - - - , the servo motor 2 can not be placed in a start state. Thus, even if the first relay AX1 or the second relay AX2 becomes failure, the safety of workers is secured.

The stopping apparatus for a servo motor according to the embodiment is not limited to the aforesaid embodiment and may be implemented in various manners. For example, although the stopping apparatus for a servo motor according to the embodiment is arranged to disable the servo motor from being driven when the opening state of the movable protection guard is detected, the servo motor may be disabled from being driven when another state is detected. For example, a restricted area may be provided around a production machine, and the servo motor may be disabled from being driven when it is detected by an infrared ray sensor for detecting intrusion that a worker enters into the restricted area.

In the case of stopping the power supply to the motor, the aforesaid embodiment is arranged in a manner that the first gate drive circuit group GD1, GD3 and GD5 is disconnected from the positive common line so as not to operate the first to third upper arm circuits. Alternatively, the second gate drive circuit group GD2, GD4 and GD6 may be disconnected from the positive common line so as not to operate the first to third lower arm circuits. In this case, all the first to third upper arm circuits are operated simultaneously in order to stop the servo motor by the regenerative braking. Further, in the stopping apparatus for a servo motor according to the embodiment, although the circuits of the control system are configured as the positive common, it will be clear that the circuits of the control system may be configured as the negative common of negative voltage.

The invention is applicable to a stopping apparatus for a servo motor provided in other machines as well as production machines and industrial machines.

What is claimed is:

1. A method of stopping a servo motor provided in a servo motor stopping apparatus, the servo motor stopping apparatus comprising:

an inverter circuit that supplies three-phase AC current to the servo motor;

first to third arm circuits which configure the inverter circuit, and each of which comprises an upper arm circuit and a lower arm circuit;

six gate drive circuits, which are provided in correspondence to the upper arm circuits and the lower arm circuits, and which operate the upper arm circuits and the lower arm circuits; and a control circuit that outputs gate signals to the six gate drive circuits via gate signal lines, respectively, a common line, to which a predetermined voltage is applied; and a common branch line that is coupled to the common line via a switch so as to be disconnectable therefrom, wherein a first gate drive circuit group corresponds to the upper arm circuits of the first to third arm circuits and the second gate drive circuit group corresponds to the lower arm circuits of the first to third arm circuits, among the six gate drive circuits, wherein, one of the first gate drive circuit group and the second gate drive circuit group is coupled to the common line and the other group is coupled to the common branch line, wherein in a disconnected state of the common branch line from the common line, obtained by turning off the switch, the other gate drive circuit group is configured to be made inoperable and the one gate drive circuit group is configured to be operated by the gate signals from the logic circuits to place each of U−, V−, and W−phases of the servo motor in a short-circuit state, and the servo motor is adapted to be placed in a state being applied with a regenerative braking force, wherein branch lines of the common branch line are coupled to the gate signal lines of the one gate drive circuit group via logic circuits, respectively, wherein, when the control circuit outputs predetermined gate signals, the inverter circuit generates a three-phase AC current so as to drive the servo motor, the method of stopping a servo motor comprising:

separating the other one of the first gate drive circuit group and the second gate drive circuit group from the common line so as to place the other one of the first gate drive circuit group and the second gate drive circuit group in an inoperable state; and operating the one of the first gate drive circuit group and the second gate drive circuit group in accordance with a signal which is transmitted by said branch lines and said logic circuits and which represents the separation from the common line to place each of U–, V– and W–phases of the servo motor in a short-circuit state so as to place the servo motor in a state being applied with a regenerative braking force.

2. The method of stopping a servo motor according to claim 1, wherein the separation from the common line is performed in association with a detection of an open state of a movable protection guard provided at a production machine or an industrial machine.

3. A servo motor stopping apparatus comprising:

an inverter circuit that supplies three-phase AC current to the servo motor;

first to third arm circuits, which configure the inverter circuit, and each of which comprises an upper arm circuit and a lower arm circuit;

six gate drive circuits, which are provided in correspondence to the upper arm circuits and lower arm circuits, and which operate the upper and lower arm circuits;

a control circuit that outputs gate signals to the six gate drive circuits via gate signal lines, respectively;

a common line, to which a predetermined voltage is applied; and a common branch line that is coupled to the common line via a switch so as to be disconnectable therefrom, wherein a first gate drive circuit group corresponds to the upper arm circuits of the first to third arm circuits and the second gate drive circuit group corresponds to the lower arm circuits of the first to third arm circuits, among the six gate drive circuits, wherein one of the first gate drive circuit group and the second gate drive circuit group is coupled to the common line and the other of the first gate drive circuit group and the second gate drive circuit group is coupled to the common branch line, wherein the control circuit comprises a logic circuit comprising predetermined logic elements, and wherein, in a disconnected state of the common branch line from the common line, obtained by turning off the switch, the other gate drive circuit group is configured to be made inoperable and the one gate drive circuit group is configured to be operated by the gate signals from the logic circuits to place each of U–, V– and W–phases of the servo motor in a short-circuit state, and the servo motor is adapted to be placed in a state being applied with a regenerative braking force, wherein branch lines of the common branch line are coupled to the gate signal lines of the one gate drive circuit group via the logic circuits, respectively.

4. The servo motor stopping apparatus according to claim 3, wherein the servo motor is a servo motor provided in a production machine or an industrial machine.

5. The servo motor stopping apparatus according to claim 4, wherein the switch is configured to be turned off when the switch detects an open state of a movable protection guard provided at the production machine or the industrial machine.

6. A method of stopping a servo motor provided in a servo motor stopping apparatus, the servo motor stopping apparatus comprising:

an inverter circuit that supplies three-phase AC current to the servo motor;

first to third arm circuits, which configure the inverter circuit, and each of which comprises an upper arm circuit and a lower arm circuit;

six gate drive circuits, which are provided in correspondence to the upper arm circuits and lower arm circuits, and which operate the upper and lower arm circuits;

a control circuit that outputs gate signals to the six gate drive circuits via gate signal lines, respectively;

a common line, to which a predetermined voltage is applied; and a common branch line that is coupled to the common line via a switch so as to be disconnectable therefrom, wherein a first gate drive circuit group corresponds to the upper arm circuits of the first to third arm circuits and the second gate drive circuit group corresponds to the lower arm circuits of the first to third arm circuits, among the six gate drive circuits, wherein one of the first gate drive circuit group and the second gate drive circuit group is coupled to the common branch line, wherein the control circuit comprises a logic circuit comprising signal lines each being coupled to said gate signal lines via predetermined logic elements, respectively, and wherein, in a disconnected state of the common branch line from the common line obtained by turning off the switch, the other gate drive circuit group is configured to be made inoperable and the one gate drive circuit group is configured to be operated by the gate signals form the logic circuits to place each of U–, V–, and W–phases of the servo motor in a short-circuit state, and the servo motor is adapted to be placed in a state being applied with a regenerative braking force, wherein each signal line is coupled to the associated gate signal line via an inverter element, wherein an OR-element is arranged between the signal line and the associated inverter element being coupled to the gate signal line of the one gate drive circuit group and the common branch line comprises branch lines being coupled to said OR-elements with a further inverter element arranged between the common branch line and said OR-elements, wherein when the control circuit outputs predetermined gate signals, the inverter circuit generates a three-phase AC current so as to drive the servo motor, the method of stopping a servo motor comprising:

separating the other one of the first gate drive circuit group and the second gate drive circuit group from the common line so as to place the other one of the first gate drive circuit group and the second gate drive circuit group in accordance with a signal which is transmitted by the further inverter via the branch lines and which represents the separation from the common line to place each of U–, V–, and W–phases of the servo motor in a short-circuit state so as to place the servo motor in a state being applied with a regenerative braking force.

7. The method of stopping a servo motor according to claim 6, wherein the separation from the common line is performed in association with a detection of an open state of a movable protection guard provided at a production machine or an industrial machine.

8. A servo motor stopping apparatus comprising:
an inverter circuit that supplies three-phase AC current to the servo motor;
first to third arm circuits, which configure the inverter circuit, and each of which comprises an upper arm circuit and a lower arm circuit;
six gate drive circuits, which are provided in correspondence to the upper arm circuits and lower arm circuits, and which operate the upper and lower arm circuits;
a control circuit that outputs gate signals to the six gate drive circuits via gate signal lines, respectively;
a common line, to which a predetermined voltage is applied; and
a common branch line that is coupled to the common line via a switch so as to be disconnectable therefrom,
wherein a first gate drive circuit group corresponds to the upper arm circuits of the first to third arm circuits and the second gate drive circuit group corresponds to the lower arm circuits of the first to third arm circuits, among the six gate drive circuits,
wherein one of the first gate drive circuit group and the second gate drive circuit group is coupled to the common branch line,
wherein the control circuit comprises a logic circuit comprising signal lines each being coupled to said gate signal lines via predetermined logic elements, respectively, and
wherein, in a disconnected state of the common branch line from the common line obtained by turning off the switch, the other gate drive circuit group is configured to be made inoperable and the one gate drive circuit group is configured to be operated by the gate signals form the logic circuits to place each of U–, V–, and W–phases of the servo motor in a short-circuit state, and the servo motor is adapted to be placed in a state being applied with a regenerative braking force,
wherein each signal line is coupled to the associated gate signal line via an inverter element, wherein an OR-element is arranged between the signal line and the associated inverter element being coupled to the gate signal line of the one gate drive circuit group, and
the common branch line comprises branch lines being coupled to said OR-elements with a further inverter element arranged between the common branch line and said OR-elements.

9. The servo motor stopping apparatus according to claim 8, wherein the servo motor is a servo motor provided in a production machine or an industrial machine.

10. The servo motor stopping apparatus according to claim 9, wherein the switch is configured to be turned off when the switch detects an open state of a movable protection guard provided at the production machine or the industrial machine.

* * * * *